1,934,055

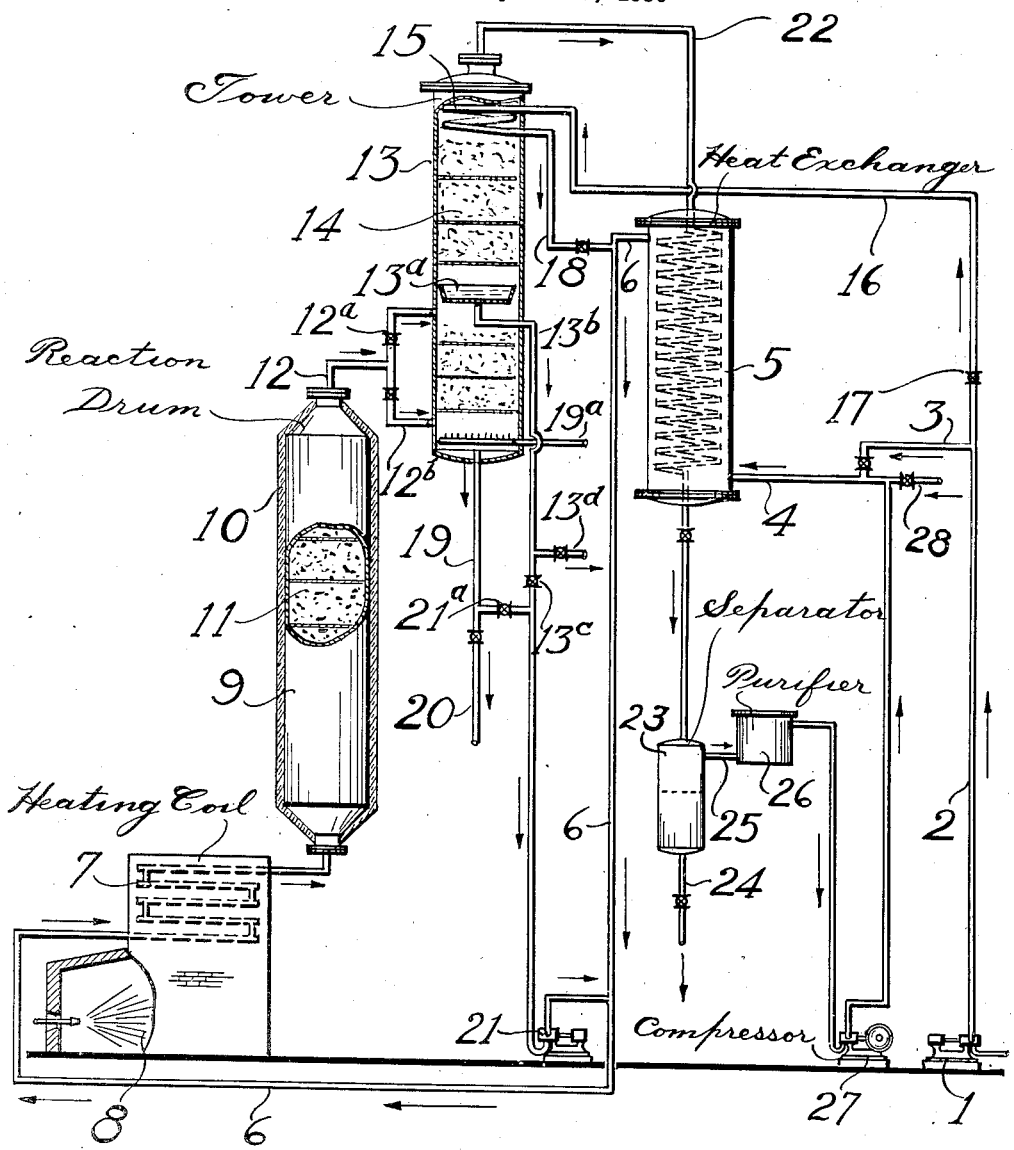
Nov. 7, 1933.  E. J. GOHR  1,934,055
METHOD FOR THE SEPARATION OF HYDROGENATED HYDROCARBONS
Filed April 25, 1930
Inventor
Edwin J. Gohr
By
W. E. Currie Attorney Patented Nov. 7, 1933

UNITED STATES PATENT OFFICE 1,934,055

METHOD FOR THE SEPARATION OF HYDROGENATED HYDROCARBONS

Edwin J. Gohr, Baytown, Tex., assignor to Standard-I. G. Company

Application April 25, 1930. Serial No. 447,140

11 Claims. (Cl. 196—53)

The present invention relates to an improved method for the separation of hydrogenated hydrocarbons and embodies an apparatus for carrying out this method.

The drawing is a diagrammatic view in sectional elevation of one form of apparatus which may be used in my process and indicates the flow of materials.

Referring to the drawing, a hydrocarbon oil distillate or reduced crude is fed from any convenient source by pump 1 into line 2 from which it passes to line 3 and line 4 where it mixes with a supply of gas rich in hydrogen. The mixture in line 4 passes to heat exchanger 5 and thence to line 6 by which it flows to heating coil 7 mounted in a suitable furnace 8. The heated gas and oil mixture is then discharged into reaction drum 9 which is provided with insulation 10. The interior of the drum is filled with a suitable catalyst 11 which may be packed into the drum in lump form or may be supported on trays. The oil which may be substantially all in the vapor state, or a mixture of vapor and liquid, depending on the density of the oil fed and the condition of operation of the drum 9, passes out of the top of the drum together with the gas through line 12 and discharges through either branch 12a or 12b into fractionation tower 13.

Tower 13 is filled with suitable packing 14, such as bricks, raschig rings, clay cylinders and the like, upon the surface of which catalytic material, which may or may not be similar to catalyst 11, is deposited. The top of the tower is provided with a cooling coil 15 to which cold feed oil is passed in regulated amounts from line 2 by means of line 16 and valve 17. The oil leaves coil 15 by line 18 which conducts it to line 6 where it mixes with the feed materials on their way to coil 7. The higher boiling materials which are separated in tower 13 may pass out of the bottom of the tower through pipe 19 and may be withdrawn through line 20 or may be preferably sent back through valve 21a for retreatment in reaction drum 9 by means of pump 21 and line 6. In some cases, especially where heavier stocks, such as reduced crudes are charged to the process, it may be desirable to withdraw oil from tower 13 by pan 13a and line 13b in order to obtain an oil free from asphaltic material for recycling to drum 9. In this type of operation, tar or asphaltic oil is withdrawn through line 19 and 20 with valve 21a closed. Valve 13c is open so that pump 21 may draw from pan 13a. The oil which collects on the pan 13a may also be withdrawn from the process by pipe 13b and connection 13d, for any desirable purpose. The lower part of tower 13 may be heated by any suitable means (not shown), or if preferred a heated or unheated gaseous material, such as hydrogen may be added through line 19a to assist in the vaporization of the lighter fractions. The gas and lighter product leave at the top of the tower, where the product may be cut to any desirable end-point by regulation of the temperature of coil 15, and pass out through line 22 to exchanger 5 where vapors are condensed.

Condensate is collected in separator 23 and drawn off as product through pipe 24. Gas is taken off by line 25 and sent to a suitable purification system 26. This may consist of any means capable of removing gaseous hydrocarbons and sulfur-containing compounds from the gas, for example scrubbing with heavy oil. The purified gas then passes to booster compresser 27 which forces the gas back to line 4 for recycling through the apparatus. Fresh hydrogen may be added by means of line 28.

In the operation of my method the feed stock may comprise distillates such as gas oil, heavy naphtha, kerosenes, and the like, and in certain types of operation heavier feed stocks may be used, as will be disclosed below. The feed stock is preferably heated in a coil in admixture with hydrogen to a point sufficient to maintain the desired temperature in the catalytic reactor into which the mixture is next introduced. It is often possible, particularly when the catalytic reactor is operated at 950 to 1050° F., to heat the material in the coil to a temperature 50 to 100° F. lower than that desired in the catalytic reactor, since the high heat of reaction in such cases is sufficient to bring the materials up to the desired temperature and to maintain them in the reactor at that point. The catalyst in the reactor may consist of the oxides or sulfides of such materials as chromium, molybdenum, or tungsten, their mixtures with each other, or with other compounds, such as zinc oxide, magnesia or alumina. Such catalysts are not poisoned by sulfur compounds present in the hydrocarbon oils and may be suitably classified as sulfactive catalysts. The catalyst may be in lump form and packed into the reactor, or it may be supported upon trays.

The temperature at which the reactor is operated is, in general, above 850° F. and may be as high as 1050° F. Temperatures from about 930 to 1050° F. are preferably used when low boiling oils of marked anti-detonation properties are desired from distillate oils. In certain cases, as in the production of kerosenes of excellent smoke rating from distillates the temperature of operation may be between about 750 and 830° F. As mentioned above, heavy feed stocks such as reduced crudes, cracking coil or coke oven tars, may be employed in certain cases. This may be carried out by operating at temperatures between about 840 and 910° F. with liquid phase in the reactor whereby a liquid level is maintained therein and the product is distilled from the reactor as a vapor in conjunction with the gas. In such an operation it is often preferable to use the catalyst in a powdered form suspended in the liquid in the reactor, although a lump catalyst may be employed, in which case a mixture of vapor and liquid may pass from the reactor.

The pressure in the apparatus is held above 20 atmospheres and may be 100 or 200 atmospheres. An excess of hydrogen is passed through the reactor with the oil, preferably in the ratio of about 2000 to 6000, or even 10,000 cubic feet per barrel of oil fed to the process. The feed rate is expressed in terms of the volume of the reactor and is ordinarily held between about 0.5 and 3.0 volumes of oil per volume of reactor per hour.

The oil leaving the reactor ordinarily contains material which is too high boiling and as such has not been or is only partially converted. It is preferable to separate these heavier materials so that they may be re-passed through the apparatus for conversion to the desired product, or withdrawn from the process for other desirable purposes. In some cases, especially when heavy stocks, such as reduced crudes, are charged, this heavier fraction may be separated into two streams, the heavier of which consists of asphaltic or difficultly converted materials which may be withdrawn from the apparatus, while the lighter stream may be recycled to the reactor. This latter stream may be withdrawn from the apparatus, for any desirable purpose if desired, for example for charging to cracking coils. In order to effect this separation it is preferable to employ a column which embodies a rectification means so that close separation may be obtained. If the usual type bubble tower or packed tower is used, considerable decomposition of oil takes place in the tower because of the comparatively long time for passage therethrough at the high temperatures necessary in the tower because of the pressures employed. This decomposition results in deposition of coke or tarry material in the tower. Furthermore, the temperature of the tower may exert a deleterious effect on such products as high quality burning oils which the apparatus may be adjusted to produce, as pointed out above. I have now found that the undesirable characteristics of fractionating columns may be eliminated if the packing in the tower consists of lump sulfactive catalytic material, or if such catalytic material is deposited upon the surface of suitable tower packing shapes, such as clay cylinders, raschig rings, and the like employed in the tower. The presence of catalyst in the column in conjunction with the hydrogen is instrumental in preventing undesired decomposition. The catalytic material may consist of the oxides and/or sulfides of elements of the sixth group of the periodic table, such as chromium, molybdenum or tungsten, their mixtures with each other or with other compounds such as zinc oxide, magnesia or alumina. If desired, the catalytic material may possess the same composition as that used in the reactor. It is also possible to employ a column of the bubble cap type in which the caps and trays are constructed of or coated with such materials as chromium or the materials mentioned previously. If desired, catalytic material may be placed in any suitable depth upon the trays of such a column.

The temperatures at which the column is operated depend largely upon the type of material being passed through it and the end-point desired in the overhead material, as will be understood by one skilled in the art. The end-point may, of course, be regulated by adjustment in a known manner of the temperature at the top of the tower. If the process is operated to recycle material from the column to the reactor, the fresh feed to the apparatus may be introduced directly into the column and thus carried to the reactor along with the recycle oil.

This invention is not to be limited by any theory of the mechanism of the reactions nor to any specific example which may have been given for purpose of illustration, but only by the following claims in which it is wished to claim all novelty inherent in this invention.

I claim:

1. An improved method for the separation of products of the hydrogenation of hydrocarbon oils with hydrogen under pressure in excess of 20 atmospheres and with sulfactive hydrogenation catalysts comprising discharging such products into a separation zone maintained at a pressure in excess of 20 atmospheres and not greater than the pressure used in the prior hydrogenation zone and packed with a suitable sulfactive hydrogenation catalytic material of large surface area, cooling the separation zone to cause partial condensation of vapors therein and separately withdrawing vapors and condensed fractions.

2. Process according to claim 1 in which additional hydrogen is added to the separation zone.

3. Process according to claim 1, in which both zones are maintained at pressures in excess of 100 atmospheres and fractionation is accomplished in the presence of separately added hydrogen.

4. Process according to claim 1, in which the separation zone is packed with a non-metallic hydrogenation catalyst.

5. An improved method for the separation of products of the destructive hydrogenation of hydrocarbon oils with hydrogen under pressure in excess of 20 atmospheres, which comprises passing oil and hydrogen through a catalytic reaction zone maintained at temperature and pressure sufficient for reaction, withdrawing a mixture of liquid and vapor and discharging the same into a separation zone maintained at substantially the same pressure and at a lower temperature to cause partial condensation of vapors therein and packed with a suitable non-metallic sulfactive hydrogenation catalytic material of large surface area, causing the liquid oil to pass downwardly over such catalytic packing material and passing a stream of hydrogen upwardly through the oil to effect removal of lighter constituents and separately withdrawing liquid and vaporous products from said separation zone.

6. Process according to claim 5, in which the upper end of the separating zone is cooled to effect partial condensation and in which such condensate is collected and returned to the catalytic reaction zone.

7. Process according to claim 1, in which the reaction zone is packed with a material containing a compound of a metal of the sixth group.

8. An improved method for the separation of products of the destructive hydrogenation of hydrocarbon oils with hydrogen under pressure in excess of 20 atmospheres and with sulfactive hydrogenation catalysts comprising discharging such products into a rectification zone maintained at a pressure in excess of 20 atmospheres and not greater than the pressure used in the prior hydrogenation zone, said rectification zone being packed with a suitable sulfactive hydrogenation catalyst of large surface area, cooling the upper part of said rectification zone to provide a reflux and separately withdrawing vapors and liquid fractions from said zone.

9. Process according to claim 8 in which additional hydrogen is added to the lower portion of the rectification zone.

10. Process according to claim 8 in which the rectification and destructive hydrogenation zones are at substantially the same pressure.

11. Process according to claim 8 in which the product from the hydrogenation zone is withdrawn into the separation zone in a mixed liquid and vapor state and said liquid and condensed liquid fractions are separately withdrawn.

EDWIN J. GOHR.